United States Patent Office 3,434,915
Patented Mar. 25, 1969

3,434,915
GLASS LAMINATE
William E. Garrison, Parkersburg, W. Va., assignor to E. I. du Pont de Nemours and Company, Wilmington, Del., a corporation of Delaware
No Drawing. Filed Nov. 17, 1965, Ser. No. 508,371
Int. Cl. C03c 27/10; B32b 17/06
U.S. Cl. 161—199                 12 Claims This invention relates to a safety-glass laminate, the interlayer used therein and the technique of producing such interlayer.

Safety-glass laminates used for automobile windshields conventionally are formed from two sheets of glass from about 60 to 150 mils thick, and generally about 120 mils in thickness, separated by an interlayer of polyvinyl butyral from about 10 to 60 mils thick and generally 15 to 30 mils thick. A discussion of the requirements of such safty-glass can be found in U.S. Patent No. 2,946,711, issued July 26, 1960, to Chester Griswold Bragaw, Jr., and William Goodrich Simeral.

In recent years, it has been found that the penetration resistance of safety-glass laminates when impacted can be improved markedly by controlling the degree of adhesion of the interlayer to glass. Generally, this involves lowering the adhesion of the interlayer to the glass from that of conventional plasticized polyvinyl butyral to glass.

Polyvinyl butyral is formed by reacting butyraldehyde with polyvinyl alcohol. The alcohol groups left unreacted are calculated as the percent vinyl alcohol remaining in the polymer. Present-day safety-glass laminates are made using an interlayer whose base resin is composed of a polyvinyl alcohol partially condensed with butyraldehyde so that it contains from 15% to 30% of unreacted hydroxyl groups calculated as weight percent of vinyl alcohol, less than 3% by weight of ester groups calculated as weight percent of vinyl acetate and the remainder of acetal groups calculated as vinyl butyral. This material is commonly called "polyvinyl butyral" or more exactly "partial polyvinyl butyral" herein abbreviated as PVB.

Conventionally, polyvinyl butyral, as used in safety-glass laminates, contains a plasticizer. Generally, the plasticizers used are water-insoluble esters of a poly-basic acid or a polyhydric alcohol. Particularly desirable plasticizers for use in the present invention are triethylene glycol di(2-ethyl-butyrate), dibutyl sebacate, di(beta-butoxy-ethyl)adipate, and dioctyl phthalate. Other suitable plasticizers include triethylene glycol fully esterified with a mixture of 80–90% caprylic acid and 10–20% capric acid as described in U.S. Patent No. 2,372,522, dimethyl phthalate, dibutyl phthalate, di(butoxyethyl)sebacate, methyl palmitate, methoxyethyl palmitate, triethylene glycol dibutyrate, triethylene glycol diacetate, tricresyl phosphate, triethyl citrate, butyl butyryl lactate, ethyl para-toluene sulfonamide, dibutyl sulfone, lauryl alcohol, oleyl alcohol, glycerol triricinoleate, methyl lauroyl glycolate, butyl octanoyl glycolate and butyl laurate. The above list of plasticizers are suitable for use in the present invention but do not represent all the known plasticizers which can be used. Such a list would be impractical and would serve no purpose since one skilled in the art can readily select a plasticizer from the many already known. It has been found preferable to use from 34 parts to 52 parts of plasticizer for every 100 parts by weight of polyvinyl butyral for purposes of the present invention.

The present invention is directed at improving the strength properties of safety-glass laminates by controlling the adhesion of the interlayer to the glass. When safety-glass laminate is struck with a blunt object, the breakthrough strength of the laminate is principally controlled by the strength of the interlayer and its ability to absorb the energy of the impact. When an impact is suffered by a safety-glass laminate in which the glass adheres too tenaciously to the interlayer, the amount of interlayer between cracks in the glass becomes small and is not as capable of absorbing the impact energy as when an interlayer having somewhat reduced adhesion to the glass is used which results in the formation of larger areas between cracks in the glass and the availability of a larger amount of interlayer to absorb the energy of the impact. However, the adhesion of the interlayer to the glass must not be reduced to the point where chunks of glass come loose from the interlayer when the laminate suffers an impact.

A convenient test for measuring the adhesion of safety-glass interlayers to glass has been devised and is known as the peel adhesion test. This test comprises laminating a 6 by 12 inch sheet of polyvinyl butyral, 30 mils thick, between two sheets of glass 6 inches wide, and 12 inches long under conventional conditions except that a 5 mil film of "Mylar" (registered trademark of E. I. du Pont de Nemours & Co. Inc., for its polyester film) is interposed between the polyvinyl butyral and one of the sheets of glass. The construction is laminated in an oil autoclave under 225 psi pressure at 135° C. for 9 minutes. After the lamination operation, the laminate is cut into strips 6 by 1 inch and the "Mylar" and the glass adjacent the "Mylar" are removed. Then the polyvinyl butyral film is peeled back from one of the ends of the remaining glass sheet and the amount of pull at 180° necesary to part it from the glass measured, using an 'Instron" tensile testing machine. The adhesion is reported as lb./inch at a thickness of 30 mils. It has been found that peel adhesion in lb./inch=CA where A=average force in lb./inch of five specimens where C=1.59 for 15 mil sheeting, 1.31 for 20 mil sheeting, 1.13 for 25 mil sheeting and 1.0 for 30 mil sheeting. The C factor is the ratio of peel adhesion of 30 mil sheeting to peel adhesion at other thicknesses. The relationship for calculating the "C" factor is:

$$C = \left(\frac{30}{t}\right)^{2/3}$$

where $t$=sheeting thickness in mils.

Thirty mil conventional polyvinyl butyral having 22–23% hydroxyl groups calculated as weight percent vinyl alcohol requires a force of about 20 lbs./in. to peel it away from the glass in the above test. A peel adhesion value of about 6 to 12 lbs./in. is considered ideal for 30 mil sheeting. A piece of safety-glass formed with a polyvinyl butyral interlayer having an adhesion to glass of below about 6 lbs./in. as defined in the above test will permit pieces of glass to fly out when the laminate is shattered by impact. Marked increase in the strength of safety-glass laminates are observed when the polyvinyl butyral to glass adhesion is reduced to the 6 to 12 lbs./in. range in the above defined test. The moisture level in commercial sheeting is 0.2 to 0.8% and the preferred peel strengths are to be run at moisture levels in this range.

A somewhat less quantitative test, commonly known as pummel adhesion, is another method used throughout the laminated glass industry to evaluate adhesion of the interlayer to glass. This method is run as follows:

A safety-glass laminate is conditioned by subjecting it to a temperature of 0° ±1° F. for 16 ±4 hours. The conditioned laminate is held against a heavy metal angle iron set at an incline so that one side of the glass contacts only the edge of the angle iron. The laminate is then repeatedly struck with a flat-headed hammer to pulverize the glass over an area at least three inches in diameter until the adherent glass particles are less than ¼ inch in maximum dimension. Loose glass praticles are then removed by shaking the laminate upside down and the adhesion of the laminate is graded on an arbitrary scale of 0–10 corresponding to the percentage of exposed interlayer in the pulverized area. Table I shows the arbitrary scale of pummel adhesion corresponding to the approximate area of bare interlayer. For the desired impact performance, the pummel adhesion value should be in the 2 to 6 range.

TABLE I

| Percent bare interlayer: | Pummel adhesion |
|---|---|
| 100 | 0 |
| 95 | 1 |
| 90 | 2 |
| 85 | 3 |
| 60 | 4 |
| 40 | 5 |
| 20 | 6 |
| 10 | 7 |
| 5 | 8 |
| 2 | 9 |
| 0 | 10 |

A method for determining the impact resistance of safety-glass laminates is known as the five pound ball impact test. A set of ten 12″ x 12″ laminates consisting of two pieces of ⅛″ thick plate glass and the 30 mil polyvinyl butyral interlayer to be tested are prepared in the normal fashion. Each laminate is in turn laid on a horizontal steel frame which supports it by the outer 1 inch of all four edges. A hold-down frame, 12″ x 12″ outside by 11″ x 11″ inside made from steel and weighing about 6 pounds is placed on top of the supported laminate. A five pound solid steel ball is then dropped on the supported laminate so that it strikes within 1 inch of the center. If the ball does not pass through the laminate, the result is considered a support. The drop height is changed either up or down 1 foot for the next laminate according to whether the last laminate is graded, respectively, a support or a failure. Testing is continued until the ball has been dropped on all ten laminates and the 50% support height is calculated by the well-known "staircase" method.

It has now been found that the addition of certain phthalic acids, phthalate salts and phthalate complexes, in conjunction with moisture, are extremely effective in reducing the adhesion of polyvinyl butyral resin to glass and that through the use of such phthalates, it is possible to control the adhesion of polyvinyl butyral to glass to within the desired adhesion range.

This invention includes as preferred additives, the following acids.

o-phthalic acid
5-t-butylisophthalic acid
methyl hydrogen phthalate
4-hydroxyisophthalic acid
naphthalene-2,3-dicarboxylic acid These acids are effective adhesion reducing agents in the free state. However, for reasons of solubility and resin stability, it is preferred to use them as salts. It is well known to those skilled in the art that polyvinyl butyral is stabilized by a very slight excess of base, and to preserve this resin stability, the free acids should be neutralized with an appropriate base. Such bases may be selected from the following: hydroxides or carbonates of lithium; sodium; and potassium; ammonia or amines as free bases or carbonates.

As an example of the unexpected uniqueness of these adhesion reducing agents, the following compounds have considerably less effect on adhesion when incorporated at the level of 5 milliequivalents per kilogram of sheeting as their potassium salts.

phthalic acid mononitrile
2,5-pyridine dicarboxylic acid
2,3-pyridine dicarboxylic acid
1,8-naphthalene dicarboxylic acid
3,3′,4,4′-benzophenonetetracarboxylic acid Compounds which are effective are encompassed by the following general structural formula

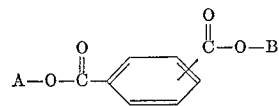

where A is selected from the class consisting of H, Li, Na, K, $NR_4$, where R is H or alkyl radicals of from 1 to 22 carbon atoms, and B includes the same meaning as A but also includes alkyl radicals of from 1 to 6 carbon atoms. The aromatic ring may be unsubstituted or substituted with such groups as hydroxyl, carbonyl, lower alkoxy, lower alkyl, of a fused aromatic ring. Generally from 0.3 to 30 milliequivalents of one of the above described agents per kilogram of plasticized resin should be used.

Examples I–III

Polyvinyl butyral sheeting containing various levels of phthalic acid was prepared in a two-inch twin screw extractor extruder from flake having a hydroxyl content of 22.7% (as polyvinyl alcohol). Phthalic acid was added to the melt in the extraction zone as an 0.13 M solution in 50 percent water-methanol. The resultant 30 mil sheeting, which contains 45 parts of 3GH plasticizer (triethylene glycol bis-2-ethyl-butyrate) per 100 parts of polyvinyl butyral, was evaluated for peel and pummel adhesion.

EXAMPLES I–III.—SHEETING CONTAINING PHTHALIC ACID

| Example: | Phthalic Level [1] | Percent $H_2O$ | Peel Adhesion | Pummel Adhesion |
|---|---|---|---|---|
| 1 | 0 | 0.31 | 19.2 | 10 |
|  |  | 0.60 | 18.0 | 9 |
|  |  | 1.04 | 16.1 | 9 |
| 2 | 2.5 | 0.36 | 12.4 | 7 |
|  |  | 0.54 | 5.2 | 3 |
|  |  | 0.80 | 4.0 | 1 |
|  |  | 1.24 | 4.5 | 2 |
| 3 | 5.0 | 0.36 | 11.7 | 7 |
|  |  | 0.53 | 4.5 | 2 |
|  |  | 0.84 | 4.3 | 2 |
|  |  | 1.28 | 4.8 | 2 |

[1] Expressed as milliequivalents of acid per kg. plasticized sheeting.

Example IV

A uniform slurry of 0.680 g. 5-t-butylisophthalic acid in 200 ml. 3GH (0.0306 meq. acid per ml. slurry) was prepared. To 66.9 g. of dry PVB flake (hydroxyl number=20, flow rate=2.5–3.5) was added various amounts of this slurry plus sufficient 3GH to give a total plasticizer level of 44 parts per hundred parts PVB. Plasticization was allowed to proceed for 16 hours at room temperature and the plasticized flake was then pressed into sheeting. The sheets were conditioned to the desired moisture level and peel adhesion was determined. The following results were obtained.

EXAMPLE IV

| Phthalic Level [1] | Percent Water In Resin | Peel Adhesion |
|---|---|---|
| 0 | 0.52 | 15.1 |
| 1.2 | 0.75 | 4.8 |
| 2.4 | 0.69 | 9.5 |
| 9.4 | 0.73 | 5.9 |

[1] Milliequivalents of acid per kg of plasticized resin.

Examples V–XIX

Sheeting containing various levels of phthalic acid was prepared in a two-inch twin screw extractor-extruder. In these cases, it was found most convenient to add solution of the phthalic acid in water by incorporating an equivalent amount of N,N-diethyl-cyclohexylamine into the solution and thereby permit the acid to be added directly to the extraction zone as an aqueous solution. The water is then driven off and the phthalic acid salt remains in the resin. N,N-diethyl-cyclohexylamine is normally added to PVB as a stabilizer, and so its presence is also important in this respect. An aqueous solution, 0.53 N in (N,N- diethylcyclohexylammonium) phthalate was prepared and pumped into the extraction zone during routine semiworks extrusion of sheeting having a hydroxyl number of 22.5, 45 parts 3GH plasticizer, and a flow rate of 0.4. The resulting sheeting was evaluated for peel and pummel adhesion.

The addition of 5-t-butylisophthalic acid was carried out in the same fashion, using a 0.53 N solution of di-(N,N - diethylcyclohexylammonium)-5-t-butylisophthalate. In other experiments, ammonia was used as the solubilizing and neutralizing agent instead of N,N-diethylcyclohexylamine and so phthalic acid was added as an 0.13 N solution of its diammonium salt. In other experiments, 0.13 N solutions of phthalic acid as salts with mono-, di-, and triethylamine, and with t-butylamine, were used. Again, the amines serve to aid solubility of the phthalic acid and as stabilizers for the resin.

Ortho-phthalic acid was also added as its salt with various alkali metals, the alkali metal serving chiefly to avoid an acidic environment in the resin and also to solubilize the acid. The phthalates were added directly to the extraction zone as dilute aqueous solutions. Similarly 5-t-butyliso-phthalic acid was incorporated into the resin.

truder as an aqueous solution. The sheeting was prepared to contain 22 to 23% hydroxyl (as vinyl alcohol) and 43 to 46 parts 3GH plasticizer per hundred parts of polyvinyl butyral. The sheeting was then conditioned to various moisture levels and laminated between 12″ x 12″ x ⅛″ sheets of glass. The laminates were tested for five-pound ball impact and pummel adhesion. Results are listed in the following table, in which the five pound test support height results reported are the 50% support heights as obtained at 73° F.

EXAMPLES XXV–XXX

| Aqueous Solution | Potassium Level [1] | Percent $H_2O$ | Peel Adhesion |
|---|---|---|---|
| Example: | | | |
| 25 ........ 0.005M dipotassium phthalate .............. | 1.6 | 0.55 | 7.0 |
| 26 ........ 0.01M dipotassium phthalate .............. | 3.7 | 0.55 | 4.1 |
| 27 ........ 0.02M monopotassium phthalate ........... | 3.6 | 0.57 | 5.8 |
| 28 ........ 0.005M dipotassium 5-t-butylisophthalate.... | 2.1 | 0.69 | 7.7 |
| 29 ........ 0.01M dipotassium isophthalate ............ | 3.5 | 0.69 | 12.8 |
| 30 ........ None (control) ........................... | 0 | 0.52 | 15.1 |

[1] Expressed as milliequivalents potassium per kg sheeting.

Example XXIV

In the following experiment, 60 g. polyvinyl butyral flake having a hydroxyl content of 22–23 percent and a flow rate of 0.4 to 0.8 was slurried in 600 ml. of water containing 5.00 milliequivalents of methyl hydrogen phthalate and an equivalent amount of potassium hydroxide for two hours. The flake was separated by filtration, dried, plasticized for 16 hours with 45 parts 3GH per 100 parts of polyvinyl butyral, and pressed into films 30 mils in thickness. Peel adhesion of these films is 2.0 lb./in. at 0.44% $H_2O$ in the sheeting. The additive level is 4.7 milliequivalents per kilogram of plasticized sheeting.

EXAMPLE V–XIX

| Example | Additive | Phthalic Level* | Percent $H_2O$ | Peel Adhesion | Pummel Adhesion |
|---|---|---|---|---|---|
| 5 | Di(N,N-diethylcyclohexylammonium)phthalate. | 3.1 | 0.28 / 0.61 | 14.4 / 6.0 | |
| 6 | Di(N,N-diethylcyclohexylammonium)5-t-bytly-isophthalate. | 5.7 | 0.60 | 8.8 | 5 |
| 7 | Diammonium phthalate | 4.1 | 0.32 / 0.45 | 10.5 / 8.3 | 3 / 4 |
| 8 | do | 2.1 | 0.31 / 0.46 | 14.1 / 13.2 | 8 / 8 |
| 9 | Di(ethylammonium)phthalate | 2.8 | 0.54 / 0.76 | 7.1 / 8.4 | 3 / 3 |
| 10 | Di(triethylammonium)phthalate | 3.0 | 0.46 / 0.58 / 0.76 | 11.7 / 8.0 / 8.1 | 6 / 4 / 3 |
| 11 | Di(t-butylammonium)phthalate | 2.9 | 0.81 | 7.0 | 4 |
| 12 | Dipotassium phthalate | 1.0 | 0.60 / 0.95 | 9.7 / 6.4 | 5 |
| 13 | do | 2.4 | 0.31 / 0.46 | 11.7 / 5.8 | 8 / 3 |
| 14 | do | 4.5 | 0.29 | 5.6 | 4 |
| 15 | do | 6.0 | 0.31 | 5.2 | 3 |
| 16 | Dilithium phthalate | 2.0 | 0.73 | 9.1 | 4 |
| 17 | do | 3.9 | 0.79 | 9.9 | 4 |
| 18 | Disodium phthalate | 2.1 | 0.46 / 0.76 | 16.0 / 5.7 | 8 / 3 |
| 19 | Dipotassium 5-t-butylisophthalate | 3.4 | 0.42 / 0.71 | 10.1 / 6.6 | |

[1] Milliequivalents of additive per kg of plasticized resin.

Examples XX–XXII

Polyvinyl butyral sheeting was extruded in a 4½ inch twin screw extractor-extruder. Phthalic acid, together with a chemically equivalent amount of potassium hydroxide and/or N,N-diethylcyclohexylamine to provide resin stability, was pumped continuously into the ex- Examples XXV–XXX One part of polyvinyl butyral flake having a hydroxyl number of 20 was slurried for two hours in 9 parts of dilute aqueous solutions of various compounds related to phthalic acid. The flake was separated by filtration, dried and plasticized to 44 parts of 3GH per hundred

EXAMPLES XX–XXIII

| Example | Addition | Phthalic Level [1] | Percent $H_2O$ | Pummel Adhesion | Support Height |
|---|---|---|---|---|---|
| 20 | Di(N,N-diethyl-cyclohexylammonium)-phthalate. | 3.1 | 0.35 | 7–8 | 16.2 |
| | | | 0.60 | 4 | 19.2 |
| 21 | Potassium (N,N-diethylcyclohexylammonium)-phthalate. | 2.9 | 0.38 | 4 | 19.5 |
| | | | 0.43 | 2–3 | 21.0 |
| | | 1.9 | 0.38 | 4 | 17.3 |
| | | | 0.44 | 3 | 19.8 |
| 22 | Dipotassium phthalate | 2.3 | 0.38 | 2–3 | 19.8 |
| | | | 0.42 | 2–3 | 20.3 |
| 23 | None (Control) | 0 | 0.40 | 9 | 11.5 |

[1] Milliequivalents of additive per kg of plasticized resin.

parts PVB for 16 hours at room temperature. The plasticized flake was then pressed into sheeting which was conditioned to the desired moisture level and laminated for peel adhesion. The following data were obtained.

I claim:
1. A composition consisting essentially of polyvinyl butyral resin having from 18 to 24 percent unreacted hydroxyl groups, calculated as weight percent of vinyl alcohol, and containing from 0.3 to 30 milliequivalents per kilogram of an agent having the structure

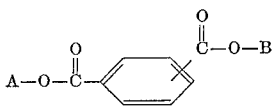

wherein A is selected from the class consisting of H, Li, Na, K and NR₄, wherein R is selected from the class consisting of H, and alkyl radicals containing from 1 to 22 carbon atoms and wherein B has the same meaning as A and alkyl radicals containing from 1 to 6 carbon atoms, wherein the aromatic ring may be substituted with a group selected from the class consisting of hydroxyl, halo-, lower alkoxy, lower alkyl, and a fused aromatic ring.

2. The composition of claim 1 wherein the aromatic ring is unsubstituted.

3. The composition of claim 1 wherein the carboxylate groups are arranged ortho to each other.

4. The composition of claim 3 wherein the agent is phthalic acid.

5. The composition of claim 3 wherein the agent is dipotassium phthalate.

6. The composition of claim 3 wherein A and B are NR₄.

7. The composition of claim 1 wherein the carbonyls are arranged meta to each other.

8. The composition of claim 7 wherein the agent is 5-t-butylisophthalic acid.

9. The composition of claim 7 wherein the agent is dipotassium-5-t-butylisophthalate.

10. The composition of claim 7 wherein the agent is an amine salt of 5-t-butylisophthalic acid.

11. A safety-glass laminate formed of two layers of glass of from 60 to 150 mils in thickness and a polyvinyl butyral interlayer of from 10 to 60 mils in thickness consisting essentially of the composition of claim 1 and containing from 0.2 to 0.8 percent water.

12. A safety-glass laminate formed of two layers of glass of from 60 to 150 mils in thickness and a polyvinyl butyral interlayer of from 10 to 60 mils in thickness consisting essentially of the composition of claim 2 and containing from 0.2 to 0.8 percent water.

References Cited
UNITED STATES PATENTS 3,231,461   1/1966   Mattimoe _____ 161—199
3,262,836   7/1966   Lavin et al. _____ 161—199

ROBERT F. BURNETT, *Primary Examiner.*

WILLIAM J. VAN BALEN, *Assistant Examiner.*

U.S. Cl. X.R.
260—73; 156—106.